US012526629B2

(12) United States Patent
Ramaswamy et al.

(10) Patent No.: US 12,526,629 B2
(45) Date of Patent: Jan. 13, 2026

(54) SYSTEMS AND METHODS FOR NETWORK CREDENTIAL POLICY ENFORCEMENT IN A WIRELESS NETWORK

(71) Applicant: Verizon Patent and Licensing Inc., Basking Ridge, NJ (US)

(72) Inventors: Suresh Ramaswamy, Westford, MA (US); Samuel K. Periasamy, Plano, TX (US); Sunil Yadawad, Westford, MA (US); Sameh El-Gawady, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 459 days.

(21) Appl. No.: 17/935,203

(22) Filed: Sep. 26, 2022

(65) Prior Publication Data

US 2024/0107310 A1    Mar. 28, 2024

(51) Int. Cl.
*H04M 1/66*    (2006.01)
*H04W 12/08*    (2021.01)
*H04W 12/40*    (2021.01)
*H04W 12/71*    (2021.01)

(52) U.S. Cl.
CPC .......... *H04W 12/08* (2013.01); *H04W 12/40* (2021.01); *H04W 12/71* (2021.01)

(58) Field of Classification Search
CPC ..... H04W 12/40; H04W 12/69; H04W 12/71; H04W 12/72; H04W 12/06; H04W 12/068; H04W 12/08; H04W 12/12
See application file for complete search history.

(56) References Cited

U.S. PATENT DOCUMENTS

| 12,015,529 | B1 * | 6/2024 | Thakkar | H04W 12/06 |
| 2020/0092795 | A1 * | 3/2020 | Raval | H04L 63/101 |
| 2022/0078696 | A1 * | 3/2022 | Saxena | H04W 12/35 |

* cited by examiner

*Primary Examiner* — Shantell L Heiber

(57) ABSTRACT

A system described herein may maintain policy information associating a plurality of network credentials with respective device identifiers of User Equipment ("UEs") that are authorized to use respective network credentials to access a network. The system may receive network monitoring information indicating that a particular UE, associated with a particular device identifier, is accessing the network using a particular network credential; compare the particular device identifier and the particular network credential to the policy information; determine, based on comparing the particular device identifier and the particular network credential to the policy information, that the particular UE is not authorized to use the particular network credential; and output a notification to the network that the particular UE is not authorized to use the particular network credential to access the network, wherein the network suspends the particular network credential based on the notification.

20 Claims, 10 Drawing Sheets

SYSTEMS AND METHODS FOR NETWORK CREDENTIAL POLICY ENFORCEMENT IN A WIRELESS NETWORK

BACKGROUND

Wireless user equipment ("UE"), such as mobile telephones or other wireless communication devices, may be associated with device identifiers that uniquely identify particular UEs. One such device identifier may be an International Mobile Station Equipment Identity ("IMEI"). UEs may also utilize network credentials, such as a Subscription Permanent Identifier ("SUPI"), when communicating with one or more wireless networks. The network credentials may be provided, implemented, etc. via a SIM ("Subscriber Identification Module") card or other secure mechanism. SIM cards may be removable and may therefore be able to be installed in or otherwise used with different UEs.

DETAILED DESCRIPTION OF EXAMPLE EMBODIMENTS

Figure 1:
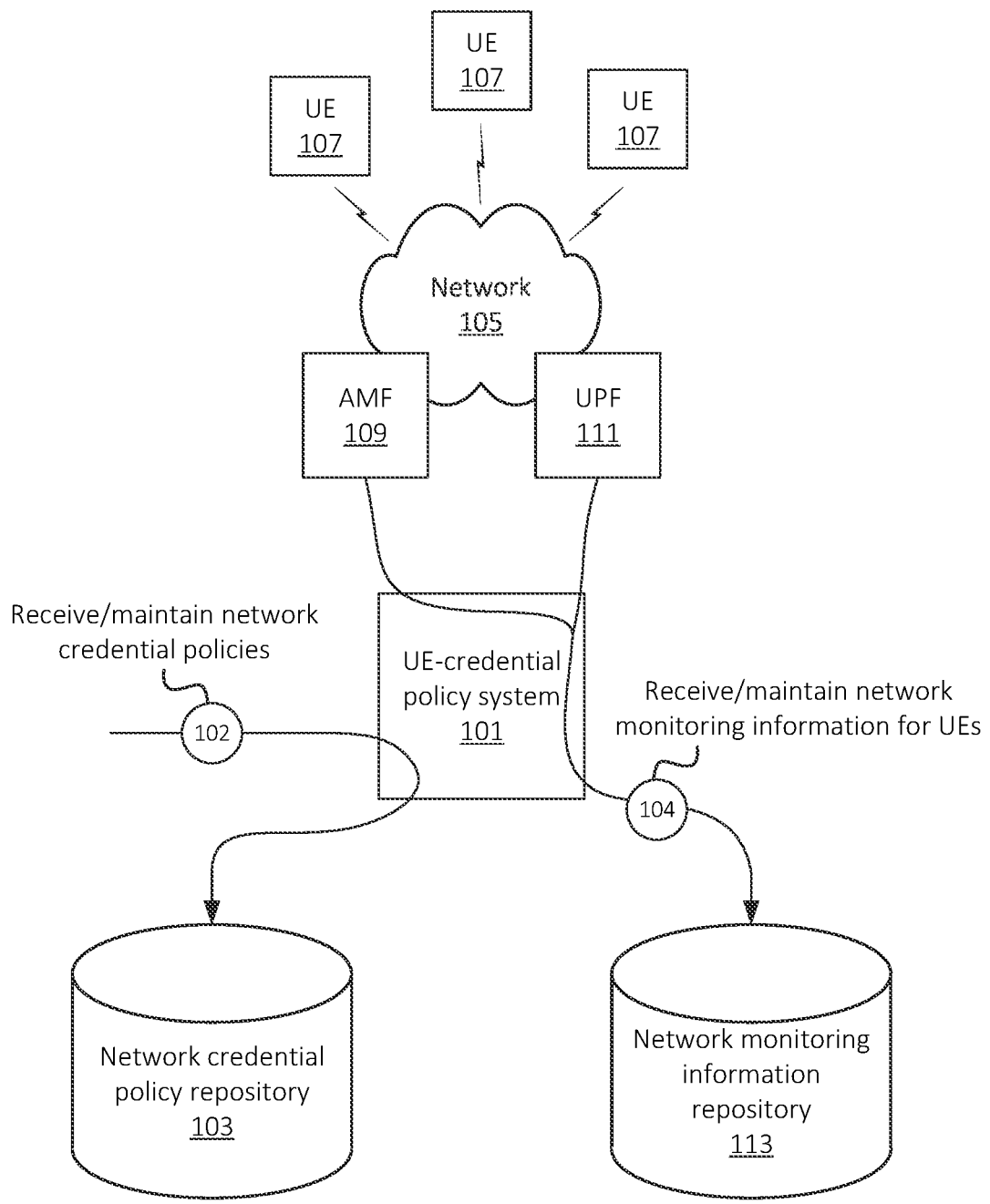
FIG. 1 illustrates an example overview of one or more embodiments described herein.

The following detailed description refers to the accompanying drawings. The same reference numbers in different drawings may identify the same or similar elements.

UEs may communicate with networks, such as wireless networks, using network credentials that are able to be verified, authenticated, etc. by a given wireless network. Some wireless networks may make use of SIM cards, Universal Integrated Circuit Cards ("UICCs"), embedded SIMs ("eSIMs"), and/or other secure mechanisms by which UEs may provide network credentials indicating that such UEs are authorized to communicate via such networks, and/or are otherwise registered with such networks (e.g., as a "home" network). UEs may also have hardware or device identifiers that uniquely identify particular UEs, such as IMEI values, Electronic Serial Numbers ("ESNs"), and/or other unique device identifiers. Since network credentials may be implemented or provided via removable or portable mechanisms, such as SIM cards, the same network credentials may potentially be used by multiple different UEs or types of UEs by placing a particular SIM card in different UEs at different times. Situations may arise in which a network operator other entity may wish to enforce the association between a particular UE and a particular set of network credentials. For example, a UE of a first type (e.g., a mobile telephone) maybe registered with a network, in accordance with a particular set of network credentials (e.g., as provided via a SIM card installed in the UE). Placing the same SIM card in a UE of a second type (e.g., an autonomous vehicle, a wireless manufacturing robot, etc.) may potentially allow the second UE to access the network using the same network credentials. However, the differing types of UEs may be associated with different usage characteristics or Quality of Service ("QoS") requirements, which may result in unexpected network load, a reduced user experience or other QoS metrics, or other potential issues.

Embodiments described herein provide for the enforcement of policies relating to the association of particular devices (e.g., UEs) or device types (e.g., mobile telephones, tablets, autonomous vehicles, Internet of Things ("IoT") devices, etc.), to particular network credentials. As discussed above, network credentials may include and/or may otherwise be associated with SUPI values, Globally Unique Temporary Identifier ("GUTI") values, Subscription Concealed Identifier ("SUCI") values, or the like. In some embodiments, network credentials may be provided by, may be implemented by, may be computed by, may be derived by, and/or may otherwise be associated with a SIM card, a UICC, and/or some other secure authentication mechanism. In some embodiments, as discussed below, particular UEs may be associated with particular network credentials, such that UEs that are not authorized to utilize a particular set of network credentials may be restricted from communicating via one or more networks. Such restrictions may include the suspending of the network credentials, the rejection of traffic to and/or from the UE, and/or other suitable restrictions. In some embodiments, as discussed below, the restrictions may be granular, such that certain types of traffic, certain communication endpoints, and/or traffic associated with other attributes may be blocked or otherwise restricted when a UE is using unauthorized network credentials. In some embodiments, the policies may be based on temporal conditions (e.g., time of day, day of week, season, etc.), location-based conditions, event-based conditions, or other suitable conditions or criteria.

FIG. 1 illustrates an example overview of some embodiments. As shown, UE-credential policy system ("UCPS") 101 may receive and/or maintain (at 102) network credential policies associating respective network credentials with UEs that are authorized to use such network credentials. UCPS 101 may store such information in network credential policy repository 103, which may be implemented as a local storage device with respect to one or more devices that implement UCPS 101, and/or may be implemented as one or more remote storage devices by one or more datacenters, servers, databases, cloud systems, etc. UCPS 101 may, in some embodiments, receive (at 102) the network credential policies from an operator, administrator, etc. associated with one or more networks, such as network 105, which may provide connectivity (e.g., wireless connectivity) to one or more UEs 107. Network 105 may include and/or may be communicatively coupled to, for example, a RAN that serves a wireless interface for UEs 107, a core network that performs traffic routing and/or other services, and/or some other type of network. In some embodiments, network 105 may include a private network, which may include a separate instance of a core network or other type of network, and which may share hardware resources (e.g., radio resources of a RAN) with one or more other networks, such as a public mobile network or one or more other private networks.

Network 105 may include various network elements (e.g., devices, systems, Virtualized Network Function ("VNF s"), Cloud-Native Network Functions ("CNF s"), etc.) that perform various operations to route, process, forward, etc. traffic associated with UEs 107. Additionally, network 105 may include one or more network elements that perform other functions, such as monitor the location of respective UEs 107, facilitate the establishment of communication sessions between UE 107 and network 105, etc. In the examples described herein, for example, network 105 may include one or more Access and Mobility Management Functions ("AMFs") 109 that facilitate the establishment of communication sessions between UE 107 and network 105, that determine or monitor the location of UE 107, and/or that perform other functions. As another example, network 105 may include one or more User Plane Functions ("UPFs") 111 that may route, forward, etc. user plane or application traffic between UE 107 and one or more other devices, systems, or networks (e.g., another UE 107, an application server, a content streaming server, another network 105, etc.).

In some embodiments, network 105 may include one or more other devices, systems, VNFs, CNFs, etc. that perform one or more of the above functions and/or other suitable functions. For example, in some embodiments, network 105 may be a private network in which other network elements, such as proprietary or custom-configured devices or systems, monitor UE location, facilitate communication session establishment, route traffic, etc. Similar concepts discussed herein (e.g., with respect to AMF 109 and/or UPF 111) may apply to implementations in which network 105 includes network elements, in addition to or in lieu of AMF 109 and/or UPF 111, that perform suitable operations as discussed herein.

UCPS 101 may receive and/or maintain (at 104) network monitoring information from network 105. For example, as discussed herein, UCPS 101 may communicate with AMF 109 and/or UPF 111 to receive network monitoring information associated with one or more UEs 107 that are connected to network 105. AMF 109 and/or UPF 111 may, for example, communicate with UCPS 101 via a Network Exposure Function ("NEF"), a Service Capability Exposure Function ("SCEF"), an application programming interface ("API"), and/or some other suitable interface. In some embodiments, AMF 109 may communicate with UCPS 101 via an implementation of, and/or via a modified version of a, pre-defined or standard interface (e.g., an N26 interface, an N11 interface, etc.). In some embodiments, UPF 111 may communicate with UCPS 101 via an implementation of, and/or via a modified version of a, pre-defined or standard interface (e.g., an N9 interface, an N4 interface, etc.). In some embodiments, UCPS 101 may communicate with one or more other elements of network 105 via a NEF, a SCEF, and/or some other suitable communication pathway. For example, one or more other elements of network 105 may provide network monitoring information, such as a Session Management Function ("SMF"), a charging system, or some other suitable device, system, VNF, CNF, etc. In some embodiments, one or more other elements of network 105 may provide UE attribute information to UCPS 101, such as a Unified Data Management function ("UDM"), a Home Subscriber Server ("HSS"), or some other suitable device, system, VNF, CNF, etc.

In some embodiments, network 105 (e.g., AMF 109, UPF 111, a NEF, etc.) may "push" network monitoring information to UCPS 101 on an ongoing basis, such as on a periodic or intermittent basis, and/or on an event-driven basis. For example, network 105 may push network monitoring information when a UE wirelessly connects to a RAN associated with network 105, when a new communication session (e.g., a protocol data unit ("PDU") session or other type of communication session) is established or requested for UE 107, and/or based on the occurrence of some other specified event. Additionally, or alternatively, UCPS 101 may "pull" the network monitoring information by outputting a request to network 105 (e.g., to AMF 109, UPF 111, and/or some other suitable device or system of network 105) for monitoring information on an ongoing basis.

As discussed below, UCPS 101 may compare the network monitoring information (e.g., as received at 104) to network credential policies (e.g., as received at 102), in order to determine whether any UEs 107 are violating any network credential policies. Such a situation may occur when a SIM card is moved from one UE 107 to another, and/or in some other situation where a mismatch exists with respect to a set of network credentials and a unique UE identifier of a given UE 107.

Figure 2:
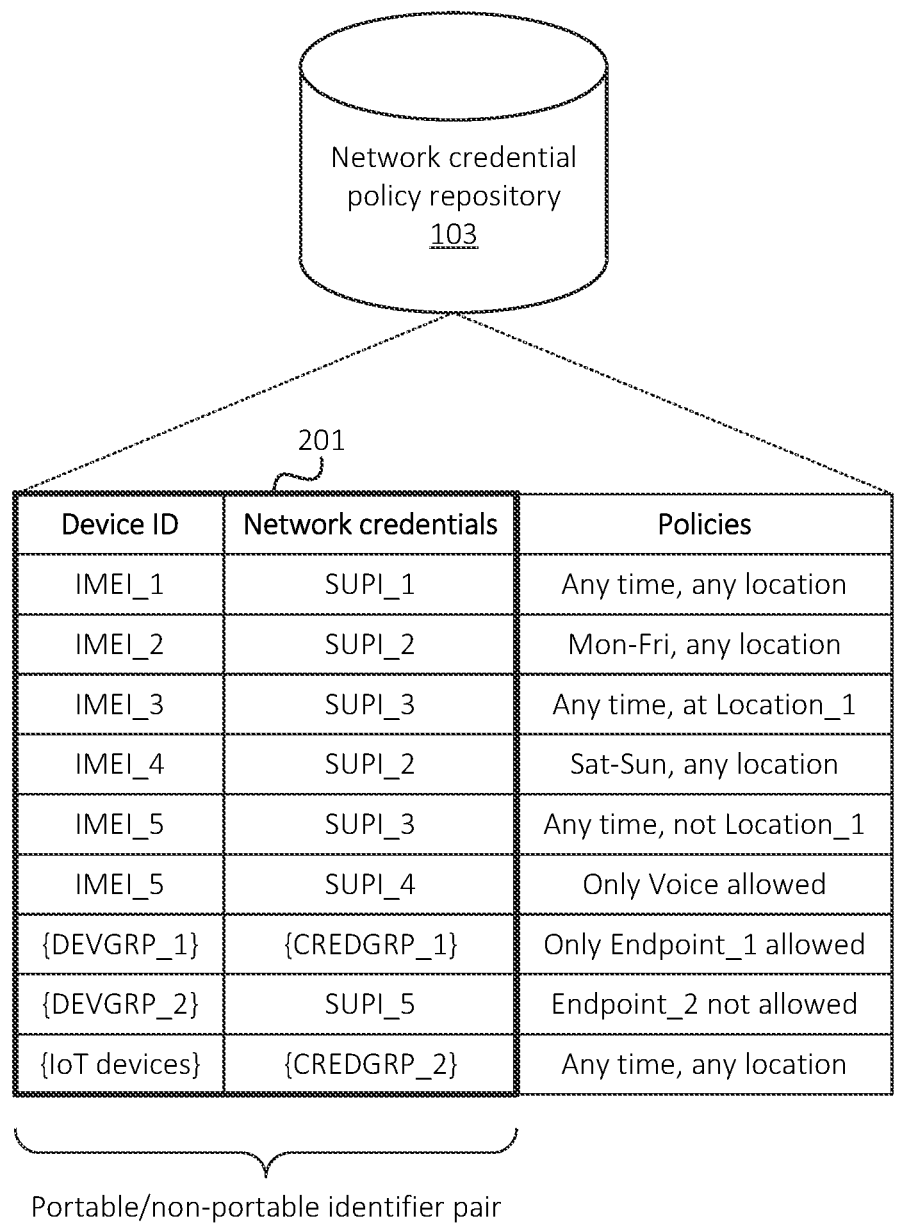
FIGS. 2 and 3 illustrate example data structures that may be used in accordance with some embodiments.

FIG. 2 illustrates an example data structure 201, which may be maintained by network credential policy repository 103 to store one or more network credential policies. In practice, network credential policy repository 103 may store network credential policies in some other format or data structures. Additionally, in some embodiments, network credential policies may include different and/or different types of policies than discussed in this example.

As shown, data structure 201 may include information associating device identifiers with network credentials. For example, data structure 201 may indicate that a first device identifier is associated with a first set of network credentials. In the examples provided herein, device identifiers are discussed in the context of IMEI values and network credentials are discussed in the context of SUPI values for the sake of brevity. In practice, similar concepts may apply when other types of device identifiers and network credentials are used. For example, similar concepts may apply for other types of portable network credentials that are able to be moved from device to device, and/or other types of device identifiers that uniquely identify a respective device (e.g., non-portable device identifiers). Further, concepts that are discussed herein with respect to "network credentials" may apply for portable identifiers that are not necessarily used as network credentials. As such, the information reflected in data structure 201 may indicate "pairs" (or other groupings) of portable identifiers (e.g., network credentials or other identifiers that may be moved from device to device) and non-portable identifiers (e.g., device identifiers that are not able to be moved from device to device).

In the example of FIG. 2, a first device identifier (e.g., a first non-portable identifier, a first IMEI value, etc., represented as "IMEI_1") may be associated with a first set of network credentials (e.g., a first portable identifier, a first SUPI value, etc., represented as "SUPI_1"). For example, IMEI_1 and SUPI_1 may be a pair or group of identifiers (e.g., a portable/non-portable identifier pair, referred to herein simply as "identifier pair" for the sake of brevity).

Data structure 201 may further include a set of policies associated with one or more identifier pairs. The policies may indicate, for example, conditions, criteria, etc. under which the identifier pairs are to be enforced. In data structure 201, for example, the IMEI_1/SUPI_1 pair is associated with a "any time, any location" policy. This policy may indicate that SUPI_1 is authorized to be used only by a particular UE (e.g., a UE that is associated with IMEI_1).

As further shown, data structure 201 may also indicate that the IMEI_2/SUPI_2 pair is to be enforced during a particular timeframe, such as Monday-Friday. For example, this policy may indicate that SUPI_2 is only permitted to be used by a UE associated with IMEI_2 during the particular timeframe, but that this policy does not apply during other times (e.g., Saturday-Sunday). That is, during these other times, SUPI_2 may not be required to be used by the UE associated with IMEI_2.

Data structure 201 may also indicate that the IMEI_3/SUPI_3 pair is to be enforced when a UE, associated with IMEI_3 and using SUPI_3 to register with network 105, is located at a particular location (denoted as "Location_1"). The location may be specified in terms of geographical location or region, a particular cell or coverage area associated with network 105 (e.g., an Evolved Universal Mobile Telecommunications Service Terrestrial Radio Access Network ("E-UTRAN") Cell Identifier ("ECI"), an E-UTRAN Cell Global Identifier ("ECGI"), a New Radio ("NR") Cell Global Identity ("NCGI"), etc.), a set of latitude and longitude coordinates, an address, and/or some other indication of location in which the identifier pair should be enforced.

As further shown, multiple UEs (e.g., associated with different device identifiers) may be associated with policies for the same network credentials. For example, data structure 201 includes a policy for the IMEI_4/SUPI_2 identifier pair. As noted above, SUPI_2 is also included in the identifier pair IMEI_2/SUPI_2. In some embodiments, UCPS 101 may verify that no logical conflicts exist in scenarios where the same network credentials are included in identifier pairs with multiple different device identifiers. In this example, the IMEI_4/SUPI_2 identifier pair does not conflict with the IMEI_2/SUPI_2 pair, as the policies for these two pairs are not ambiguous, do not overlap, and/or otherwise do not conflict. For example, the IMEI_4/SUPI_2 identifier pair is enforced on Saturdays and Sundays, while the IMEI_2/SUPI_2 identifier pair is enforced on Mondays through Fridays. Thus, a situation does not exist where both policies would be in effect, and UCPS 101 may therefore validate, approve, etc. both policies. On the other hand, in situations where multiple policies may conflict or overlap, UCPS 101 may generate a report or output an alert, notification, etc. indicating that multiple policies conflict. For example, when receiving input specifying a new policy that would conflict with an existing policy, UCPS 101 may forgo recording the new policy to network credential policy repository 103.

As another example of a policy that associates the same network credentials with different device identifiers, SUPI_3 may be included in an identifier pair with IMEI_3 and another identifier pair with IMEI_5. The IMEI_3/SUPI_3 pair may be in effect when a UE with IMEI_3 uses SUPI_3 when the UE is located at a first location (e.g., Location_1), while the IMEI_5/SUPI_3 pair may be in effect when another UE with IMEI_5 uses SUPI_3 when the other UE is located at a second location (e.g., Location_2).

Policies for identifier pairs may additionally, or alternatively, specify traffic attributes and/or other parameters to enforce with respect to particular network credentials and/or identifier pairs. For example, the IMEI_5/SUPI_4 identifier pair may indicate that only voice call traffic is permitted for a UE with IMEI_5 when the UE uses SUPI_4. In some embodiments, such policies may be combined with other types of policies, conditions, etc., such as location-based or time-based criteria (e.g., only voice calls allowed during certain times, content streaming traffic not allowed in certain locations, etc.).

As another example, policies may specify an allow list or a blocklist of endpoints (e.g., application servers, networks, other UEs, etc.) with which a given identifier pair is allowed or not allowed to communicate. Such endpoints may be specified in terms of Internet Protocol ("IP") address, device name, UE identifier, Fully Qualified Domain Name ("FQDN"), and/or other suitable identifier.

Further, while the above examples describe identifier pairs in terms of a single device identifier and a single network credential, in practice, policies may be specified on the basis of groups of device identifiers and/or groups of network credentials. Such implementations may be useful in situations where a "pool" or set of UEs are provided or used by a given organization or other entity, and where a pool of SIM cards are provided or used by the same organization or other entity. In this situation, policies with respect to each UE and/or SIM card (e.g., each device and each set of network credentials) may be the same, and the particular association between particular UEs and respective SIM cards may not be necessary (e.g., the associations may be fungible). For example, as shown in data structure 201, "DEVGRP_1" may represent a set of device identifiers (e.g., a set of multiple IMEI values that are each associated with a given UE), and "CREDGRP_1" may represent a set of network credentials (e.g., a set of multiple SUPI values that are each associated with a given SIM card). Thus, in situations where a UE that has an IMEI that is in DEVGRP_1 and that uses a SUPI that is in CREDGRP_1 may be associated with a valid identifier pair. In this example, DEVGRP_1/CREDGRP_1 identifier pairs may further be associated with a policy specifying that corresponding UEs are only permitted to communicate with a particular endpoint (e.g., "Endpoint 1").

In some embodiments, network credential policy repository 103 may include UE attributes, categories, etc. in addition to, or in lieu of, a device identifier. For example, a device group may specify attributes, criteria, etc. in addition to or in lieu of particular device identifiers. For example, a particular policy may specify that a particular SUPI or set of SUPIs is/are permitted to be used with devices of a particular type (e.g., mobile phones, manufacturing robots, IoT devices, etc.), and/or that such SUPI or SUPIs is/are not permitted to be used with devices of a particular type.

Figure 3:
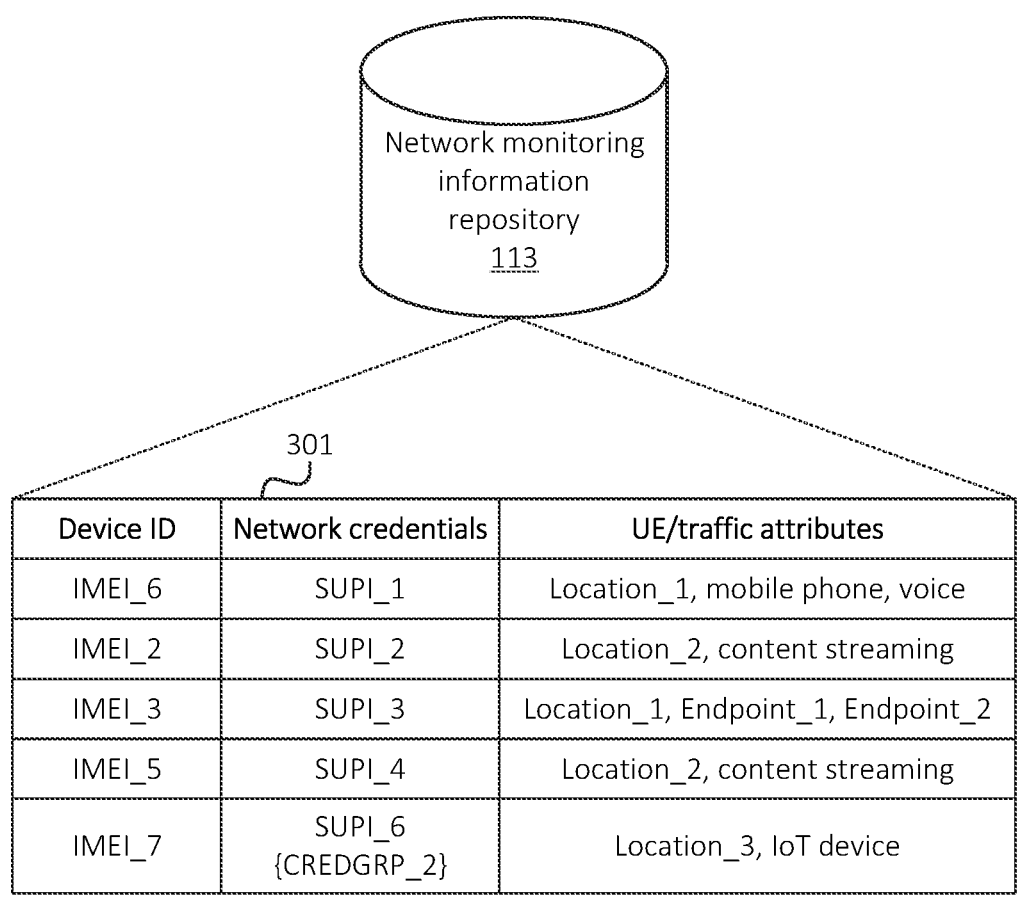

As shown in FIG. 3, network monitoring information repository 113 may receive, maintain, etc. data structure 301, which includes network monitoring information (e.g., on a real time or near-real time basis, and/or on some other ongoing basis). As noted above, the information maintained in data structure 301 may be received from one or more sources, such as AMF 109, UPF 111, and/or some other source. For example, some or all of the information maintained in data structure 301 may be received from an application server or other device or system that receives, monitors, etc. location information of one or more UEs 107. In some embodiments, UEs 107 may themselves report location information and/or other suitable information to UCPS 101 (e.g., via an API or other suitable communication pathway). As another example, some or all of the information may be received from one or more application servers or other endpoints that communicate with one or more UEs 107.

As shown, for example, data structure 301 may include a device identifier and/or network credentials associated with one or more UEs 107 that communicate via network 105. In some embodiments, data structure 301 may include additional or different information, such as an IP address, performance metrics, usage metrics, or other information associated with UEs 107. As shown, for example, data structure 301 may indicate that a particular UE 107 with IMEI_6 is using SUPI_1 to communicate with network 105. For example, UCPS 101 may receive such information from AMF 109 when UE 107 connects to network 105 (e.g., connects to a RAN included in or otherwise associated with network 105), when UE 107 requests the establishment of one or more communication sessions (e.g., PDU sessions or other types of communication sessions), when UE 107 moves from one cell to another, and/or on some other event-driven basis. Generally, for example, AMF 109 may provide an identifier pair associated with a given UE 107 when AMF 109 receives or outputs control signaling that includes the identifier pair (e.g., where such control signaling may be communicated with UE 107 via an Ni interface, between AMF 109 and a Session Management Function ("SMF") or other network element of network 105, etc.).

In some embodiments, UCPS 101 may request (e.g., via a NEF or some other suitable communication interface) information associated with a particular device identifier or network credential, and AMF 109 may respond with an identifier pair associated with the requested device identifier or network credential. For example, UCPS 101 may output a request to AMF 109 for a SUPI associated with a particular IMEI, and AMF 109 may respond with the requested SUPI. As another example, UCPS 101 may output a request to AMF 109 for an IMEI associated with a particular SUPI, and AMF 109 may respond with the requested SUPI.

As further shown, data structure 301 may include UE and/or traffic attributes associated with each UE 107 for which an identifier pair is stored in data structure 301. As noted above, such UE and/or traffic attributes may be received from AMF 109, UPF 111 (e.g., via a NEF) and/or from some other suitable source. For example, the UE attributes for a given UE 107 may include a location of the given UE 107. As discussed above, the location may be expressed in terms of an identifier of a base station or cell to which UE 107 is connected (e.g., an ECGI, an NCGI, etc.), latitude and longitude coordinates, and/or some other indication of location. In some embodiments, the location information may be received from AMF 109, a Mobility Management Entity ("MME"), and/or some other suitable device or system that receives, monitors, provides, etc. location information for UE 107. In this example, data structure 301 indicates that a particular UE with IMEI_6, using SUPI_1, is located at Location_1.

In some embodiments, UE attributes may include a device type of UE 107 (e.g., mobile phone, IoT device, etc.), one or more categories or classifications of UE 107 (e.g., first responder, manufacturing robot, enterprise user, etc.), and/or other information associated with UE 107. In some embodiments, such attributes may be received from a UE information repository associated with network 105, such as a UDM, an HSS, or some other suitable device or system. Additionally, or alternatively, such attributes may be received from an access control system, such as AMF 109. In this example, data structure 301 indicates that the corresponding UE 107 is a mobile phone.

The traffic attributes for a given UE 107 may include an endpoint associated with one or more communication sessions associated with UE 107 (e.g., a destination of traffic received from UE 107, an origination of traffic sent to UE 107, an endpoint specified in a communication session request associated with UE 107, etc.), a traffic or application type associated with communications to or from UE 107 (e.g., voice call, AR service, gaming service, manufacturing robot control service, etc.), and/or other suitable traffic attributes. For example, such attributes may be received from UPF 111, which may identify the attributes based on header information of the traffic, session establishment messages associated with UE 107 (e.g., as received via a SMF or other suitable device), and/or may identify such attributes in some other suitable manner.

In some embodiments, UCPS 101 may generate, maintain, refine, utilize, etc. one or more models, such as artificial intelligence/machine learning ("AI/ML") models or other types of models, to identify UE and/or traffic attributes, and accordingly record such attributes to network monitoring information repository 113. For example, UCPS 101 may use AI/ML techniques to determine that a particular endpoint is associated with a particular traffic type. As another example, UCPS 101 may use AI/ML techniques to determine that a particular UE 107 is a particular device type, such as based on usage patterns, which may include traffic types, endpoint identifiers, and/or other suitable information. For example, such models may indicate that voice calls are associated with mobile phones or other suitable device types, while manufacturing robot control services are associated with remotely-controlled, semi-autonomous, and/or autonomous manufacturing robots. In this manner, UCPS 101 may identify UE and/or traffic attributes without necessarily receiving UE information from a UE information repository, such as a UDM or an HSS.

Figure 4:
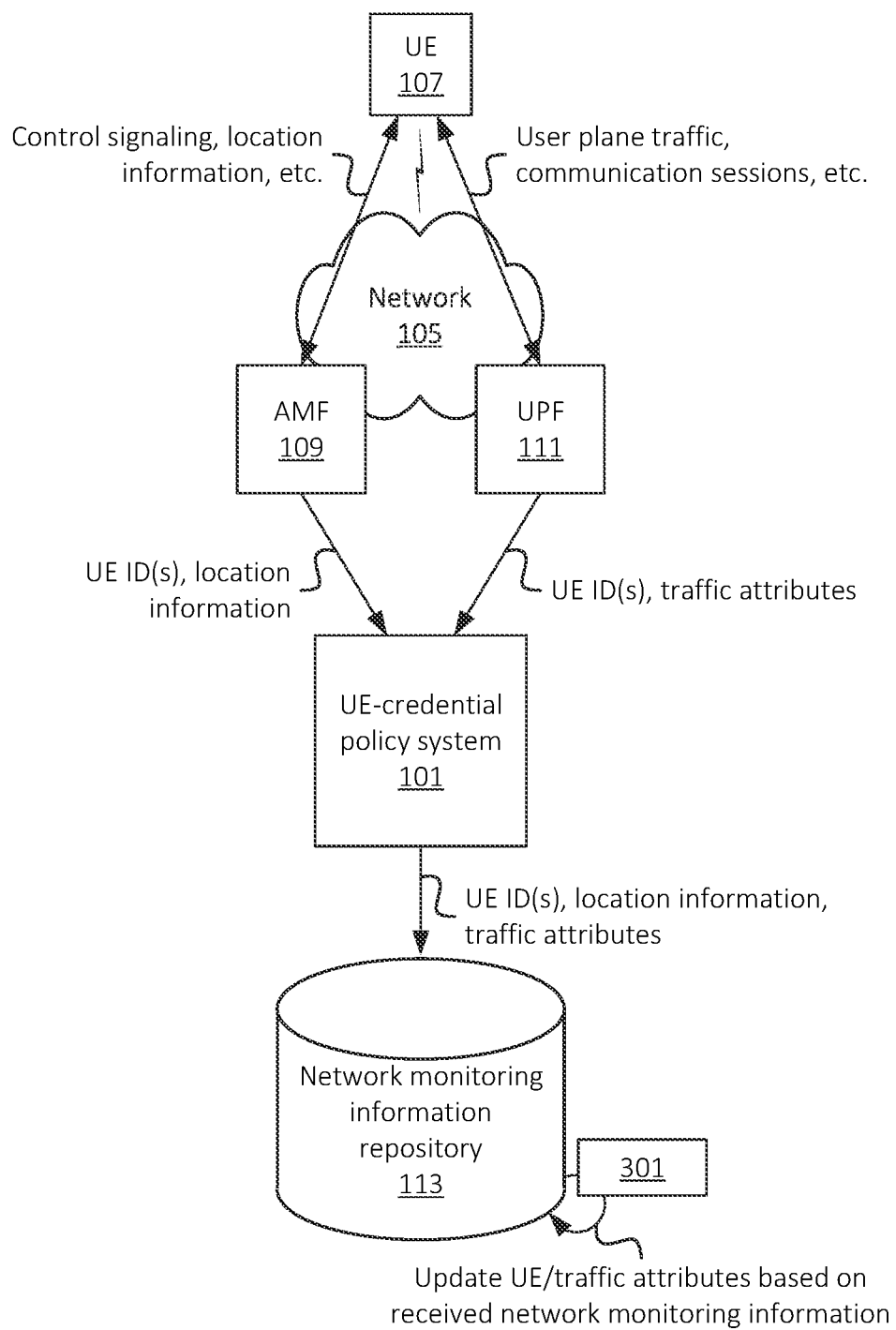
FIG. 4 illustrates an example of receiving and/or updating network monitoring information, in accordance with some embodiments.

FIG. 4 illustrates an example of UCPS 101 receiving monitoring information from elements of network 105, such as AMF 109 and UPF 111. As discussed above, for example, UCPS 101 may receive information from AMF 109, such as UE identifiers (e.g., device identifiers such as IMEIs), network credential information (e.g., SUPIs), location information, and/or other suitable information. As also discussed above, UCPS 101 may receive information from UPF 111, such as UE identifiers, network credential information, traffic attributes, and/or other suitable information. UCPS 101 may record some or all of the information, received network 105 (e.g., from AMF 109, UPF 111, and/or other suitable devices or systems) to network monitoring information repository 113, which may include generating and/or updating data structure 301, as discussed above.

Figure 5:
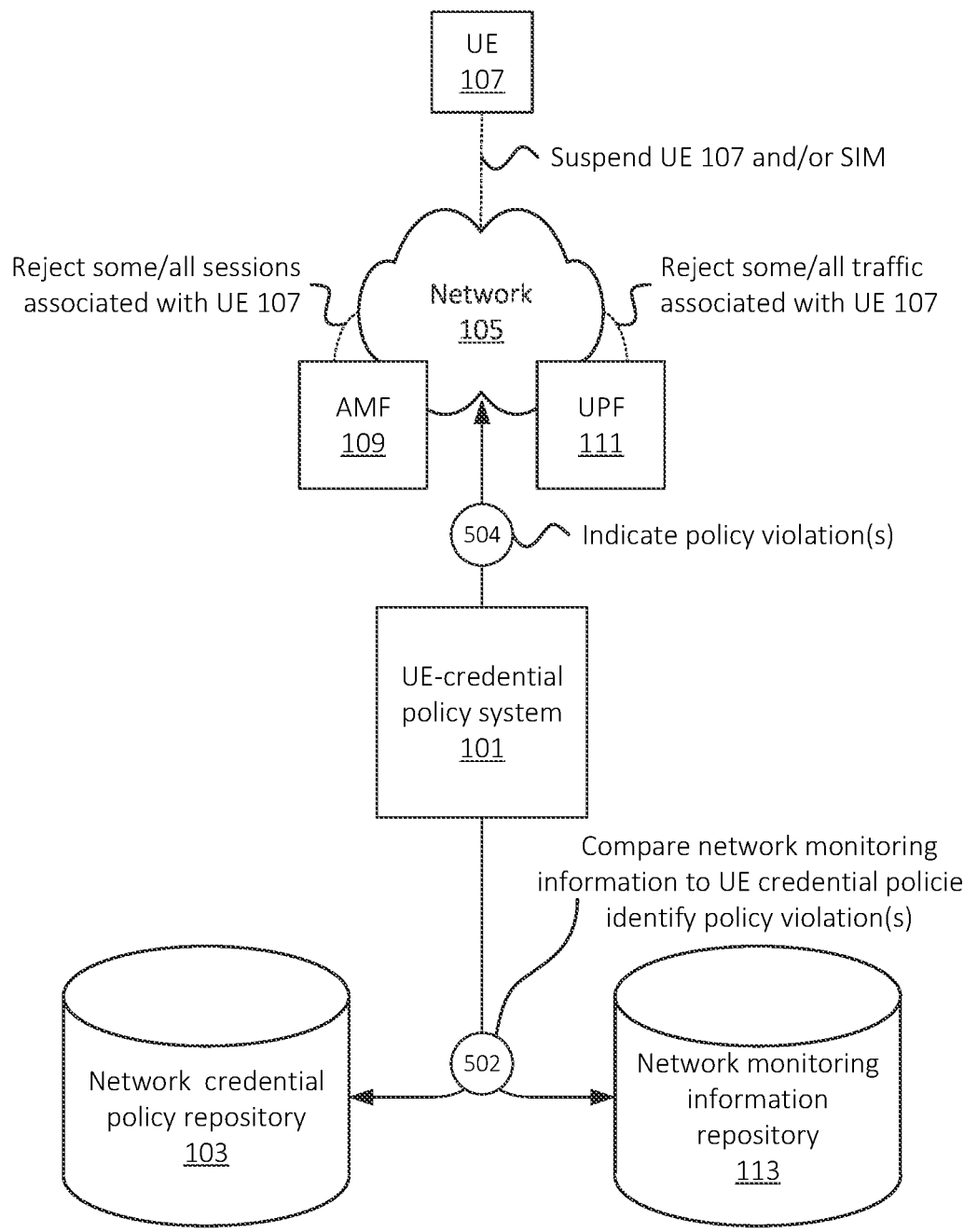
FIG. 5 illustrates an example of enforcing policies associating particular UEs with particular network credentials, in accordance with some embodiments.

FIG. 5 illustrates an example of remedial actions that may be taken when a mismatch between device identifiers and network credentials, or other policy violation, is detected by UCPS 101. As shown, for example, UCPS 101 may compare (at 502) network monitoring information (e.g., as received from AMF 109 and/or UPF 111, and/or as generated by UCPS 101 using AI/ML techniques as discussed above) to network credential policies. UCPS 101 may, for example, on an ongoing basis, compare network monitoring information (e.g., as stored in network monitoring information repository 113) to network credential policies (e.g., as stored in network credential policy repository 103) to determine whether any such policies are violated. In some embodiments, UCPS 101 may check for policy violations when data structure 201 and/or data structure 301 is updated, and/or when UCPS 101 receives network monitoring information (e.g., from AMF 109 and/or UPF 111). Additionally, or alternatively, UCPS 101 may receive a request from some other source, such as an administrator, operator, application server, etc. to check one or more policies. Such request may indicate one or more device identifiers, network credentials, or other criteria based on which UCPS 101 may determine whether one or more particular network credential policies are violated.

For example, UCPS 101 may identify identifier pairs, indicated in data structure 301 (e.g., as stored in network monitoring information repository 113), and may compare such identifier pairs to identifier pairs indicated in data structure 201 (e.g., as stored in network credential policy repository 103). If a particular identifier pair is included in network monitoring information repository 113 but is not included in network credential policy repository 103, then UCPS 101 may identify a policy violation in this situation. For example, referring to example data structures 201 and 301, network monitoring information (e.g., as stored in network monitoring information repository 113) may indicate that a particular UE with IMEI_6 is using SUPI_1. However, UE policy criteria information (e.g., as stored in 103) may not include an IMEI_6/SUPI_1 pair. That is, SUPI_1 may not be authorized to be used with a UE that has a device identifier of IMEI_6. In this situation, UCPS 101 may identify that IMEI_6 and/or SUPI_1 are associated with a violation of a network credential policy included in network credential policy repository 103. As discussed below, UCPS 101 may initiate or perform one or more remedial measures based on the determined policy violation.

As another example, UCPS 101 may identify that network monitoring information repository 113 includes information indicating that a UE with IMEI_7 is using SUPI_6. As shown in FIG. 3, SUPI_6 may be included in a particular group of network credentials (i.e., CREDGRP_2, in this example) specified in data structure 201. UCPS 101 may further identify that network monitoring information repository 113 includes information indicating that this particular UE 107 is an IoT device. Thus, in this example, although IMEI_7 may not be specifically identified with respect to a particular credential policy, UCPS 101 may determine that a policy violation has not occurred in this situation. For example, UCPS 101 may determine that SUPI_6 is in CREDGRP_2, and that a policy associated with CREDGRP_2 (e.g., as specified in data structure 201 stored by network credential policy repository 103) specifies that network credentials of CREDGRP_2 are required to be used by IoT devices. Accordingly, since the particular UE with IMEI_7 is an IoT device, UCPS 101 may determine that the use of SUPI_6 by such UE is permitted as per the policy information stored in network credential policy repository 103.

As yet another example, UCPS 101 may identify that network monitoring information repository 113 includes information indicating that a UE with IMEI_5 is using SUPI_4, and is associated with content streaming traffic (e.g., is receiving a content streaming service via network 105). In this situation, although the IMEI_5/SUPI_4 pair is authorized as per the policy information stored in network credential policy repository 103, the traffic type associated with this identifier pair is not authorized, and a policy violation may therefore be identified by UCPS 101. Although some examples are provided above, in practice, UCPS 101 may determine other types of policy violations, and/or other situations in which a policy violation has not occurred, based on the information stored in network credential policy repository 103 and/or network monitoring information repository 113.

When detecting a policy violation, UCPS 101 and/or network 105 may perform one or more remedial measures. For example, UCPS 101 may indicate (at 504) the policy violation to one or more devices or systems of network 105, such as a provisioning system, AMF 109, UPF 111, a UDM of network 105, a Policy Control Function ("PCF") of network 105, and/or some other suitable device or system. In some embodiments, a particular network element of network 105, that receives (at 504) the indication of the policy violation may store, maintain, etc. such indication, and/or may forward or otherwise provide an indication of the policy violation to one or more other network elements of network 105. For example, in some embodiments, UCPS 101 may indicate (at 504) the policy violation to a UDM of network 105 (e.g., via a NEF). In some embodiments, a Session Management Function ("SMF") of network 105 may receive or otherwise identify the indication of the policy violation as maintained by the UDM, and the SMF may forward the indication of the policy information to UPF 111 (and/or may provide other instructions, in accordance with other remedial measures, to UPF 111, as discussed below) based on the indication. As another example, UCPS 101 may indicate (at 504) the policy violation to AMF 109, which may provide such indication to a PCF of network 105. In some embodiments, the PCF may forward the indication to UPF 111, and/or may perform other remedial measures based on the indication.

In some embodiments, the indication of the policy violation (provided at 504) may include some or all relevant information from network credential policy repository 103 and/or network monitoring information repository 113, such as which policies were violated, particular network monitoring information based on which UCPS 101 determined the policy violations, etc. In some embodiments, UCPS 101 and/or network 105 may determine different remedial measures based on types of policies that were violated. In some embodiments, UCPS 101 and/or network 105 may utilize AI/ML techniques to determine which particular remedial measure to perform for different respective types of policy violations. For example, network 105 may "suspend" a particular set of network credentials (e.g., may suspend a SIM card, may suspend a SUPI, etc.). In some embodiments, network 105 may modify information stored in a provisioning system, a UE information repository, etc., to indicate that the network credentials are not authorized for use with network 105. This action may result in a particular UE 107, that is using the suspended credential, to be disconnected, "kicked off," etc. from network 105.

As another example, UCPS 101 and/or network 105 may instruct AMF 109 to reject some or all connection and/or session establishment requests that include the network credential (e.g., the SUPI), and/or a device identifier (e.g., an IMEI) of UE 107 with which the policy violation is associated. In some embodiments, UCPS 101 and/or network 105 may instruct AMF 109 to modify one or more communication sessions associated with UE 107, such as reducing a Quality of Service ("QoS") level of such communication sessions to a "best effort" QoS level or some other QoS level, or performing some other suitable modification. Additionally, or alternatively, UCPS 101 and/or network 105 may instruct AMF 109 to disconnect, tear down, etc. one or more existing communication sessions between UE 107 and network 105.

As yet another example, UCPS 101 and/or network 105 may instruct UPF 111 to reject some or all traffic associated with UE 107. Rejecting the traffic may include, for example, not forwarding traffic from UE 107 toward an indicated destination or endpoint of the traffic, and/or not forwarding traffic from such endpoint to UE 107. In some embodiments, UCPS 101 and/or network 105 may instruct UPF 111 to reject only some traffic associated with UE 107, such as traffic that violates one or more policies. For example, if certain types of traffic (e.g., associated with particular attributes, such as particular endpoints, traffic or service types, etc.) are permitted, but other types of traffic are not permitted, then UCPS 101 and/or network 105 may indicate attributes of traffic that should be rejected. For example, UPF 111 may be instructed to allow voice call traffic for one particular UE 107 (e.g., when such UE 107 is using a particular network credential), but to reject all other traffic for such UE 107. While some examples of remedial measures are discussed above, in practice other types of remedial measures may be performed by UCPS 101 and/or network 105, where different types of policy violations may be associated with different types of remedial measures.

Figure 6:
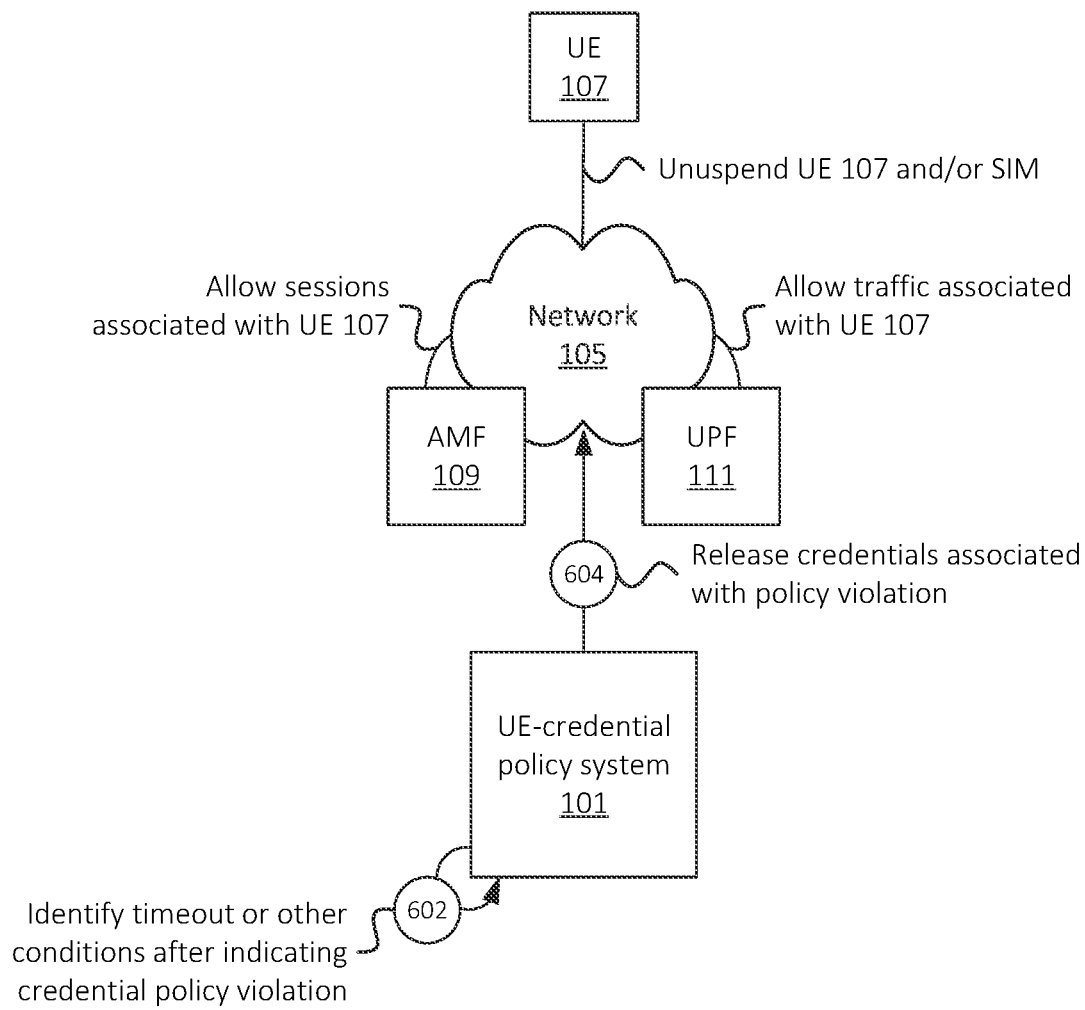
FIG. 6 illustrates an example of reverting remedial measures initiated based on detecting a network credential policy violation, in accordance with some embodiments.

As shown in FIG. 6, after detecting a policy violation, remedial measures may be reverted, undone, etc. based on one or more triggering events, the passage of time, and/or other factors. For example, UCPS 101 may identify (at 602) that a particular amount of time has elapsed (e.g., a "timeout") since UCPS 101 notified (at 504) network 105 of a particular policy violation. As another example, UCPS 101 may receive input from an operator, administrator, application server, or other authorized entity, indicating that the policy violation has concluded and/or that UCPS 101 should otherwise reset a state indicating that the policy has been violated.

UCPS 101 may accordingly output (at 604) an indication that credentials associated with the policy violation should be released, unrestricted, etc. by network 105. Based on receiving such indication, network 105 may unsuspended the network credentials (e.g., a provisioning system may unsuspended the SIM card, SUPI, etc.). As another example, UCPS 101 and/or network 105 may instruct AMF 109 and/or UPF 111 to allow (e.g., cease restricting or rejecting) communication sessions associated with UE 107 and/or the network credential. Reverting the remedial measures in such a manner may allow for the network credential and/or UE 107 to access network 105, and may give time for a user or other entity to cure any policy violations, such as by moving a SIM card to an appropriate UE 107, and/or by installing a different SIM card in a given UE 107. Additionally, or alternatively, such policy violations may be cured, remedied, etc. by otherwise changing a portable identifier or network credential associated with a given UE 107, and/or by moving or porting the portable identifier or network credential to a different UE 107.

After the network credentials are released, UCPS 101 may continue to check for policy violations associated with the released network credentials. For example, if the network credentials are released prematurely (e.g., while a policy violation is still in effect, such as when a particular UE 107 has a SIM card installed that is associated with an unauthorized SUPI), UCPS 101 may again notify (at 504) network 105 that a policy violation has occurred, and network 105 may perform one or more remedial actions based on the policy violation occurring. In some embodiments, the remedial action may be different (e.g., more severe) if the same policy has occurred multiple times (e.g., multiple times within a threshold time period). For example, if the remedial action for the first instance of the policy violation was to suspend a particular SIM card for a particular duration of time, the remedial action for the second instance of the policy violation may be to suspend the particular SIM card for a longer duration of time. As another example, if the remedial action for the first instance of the policy violation was to reject some traffic associated with UE 107 (e.g., at UPF 111), the second instance of the policy violation may be to suspend a SIM used by UE 107.

Figure 7:
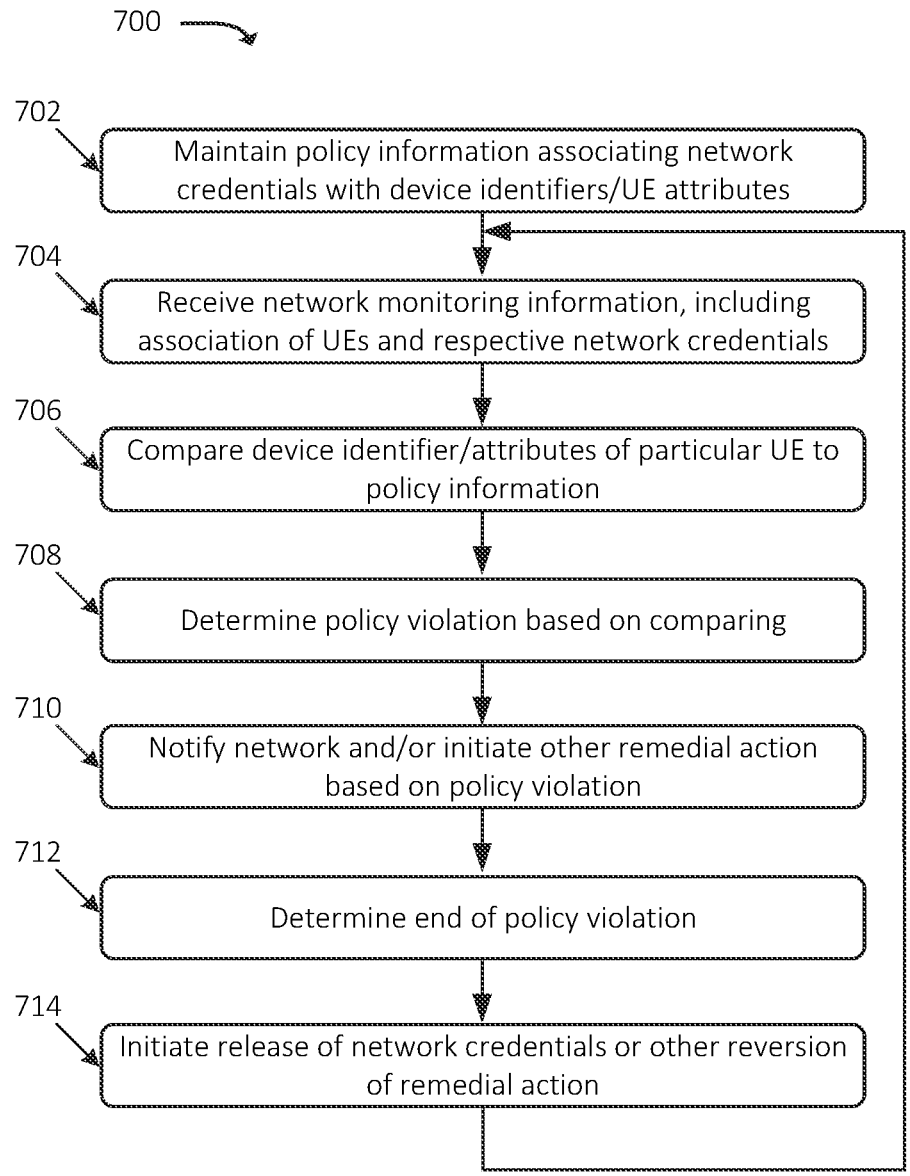
FIG. 7 illustrates an example process for enforcing policies associating particular UEs with particular network credentials, in accordance with some embodiments.

FIG. 7 illustrates an example process 700 for enforcing policies associating particular UEs with particular network credentials. In some embodiments, some or all of process 700 may be performed by UCPS 101. In some embodiments, one or more other devices may perform some or all of process 700 in concert with, and/or in lieu of, UCPS 101.

As shown, process 700 may include maintaining (at 702) policy information associating network credentials with device identifiers and/or UE attributes. For example, as discussed above, UCPS 101 may receive, maintain, refine using AI/ML techniques, etc. network credential policy information in data structure 201 and/or in some other suitable manner. The network credential policy information may, as discussed above, indicate particular device identifiers and/or UE attributes (e.g., device type, category, etc.) that are authorized to utilize respective network credentials (e.g., SUPIs and/or other suitable network identifiers) when accessing a given network 105. The device identifiers may be non-portable identifiers such as IMEI values, hardware identifiers, etc., that are not able to be changed. Such device identifiers may uniquely identify respective UEs 107, such that different UEs 107 may not be associated with the same device identifier. The network credentials may be implemented or otherwise associated with a portable mechanism which may be moved from one UE 107 to another, such as a SIM card or other suitable portable mechanism, device, object, etc.

Process 700 may further include receiving (at 704) network monitoring information, including an association of respective UEs 107 and network credentials used by such UEs 107 to access network 105. For example, UCPS 101 may receive such information from AMF 109, UPF 111, and/or some other device or system (e.g., via a NEF, SCEF, or other suitable communication pathway). As noted above, the network monitoring information may include device identifiers and/or UE attributes of one or more UEs 107 accessing network 105, as well as network credentials used by such UEs 107 to access network 105.

Process 700 may additionally include comparing (at 706) the device identifiers and/or attributes of a particular UE 107, accessing network 105, to the network credential policy information. For example, UCPS 101 may identify whether the credential policy information indicates that the network credentials used by the particular UE 107 are authorized to be used by such UE 107. For example, as discussed above, UCPS 101 may determine whether a device identifier and/or attributes of UE 107 are indicated as being authorized to use the particular network credential. In some embodiments, UCPS 101 may further identify one or more other policy criteria, such as authorized traffic types, location-based criteria, time-based criteria, and/or other suitable criteria, as discussed above. For example, such criteria may specify situations in which particular policies are in effect.

Process 700 may also include determining (at 708) a policy violation, with respect to the particular UE 107 and/or network credential, based on the comparing. For example, UCPS 101 may determine that a particular network credential policy (e.g., associated with the pw network credential used by UE 107) is in effect, such as based on a current time falling within a timeframe specified by the particular network credential policy. UCPS 101 may further determine that the particular UE 107 is not authorized to use the particular network credential, such as by determining that the network credential policy information does not indicate that the device identifier of the particular UE 107 (and/or attributes of the particular UE 107) is authorized to use the particular network credential. As another example, UCPS 101 may determine that the particular UE 107 is not authorized to use the particular network credential for one or more types or parameters of access, such as particular traffic or service types, particular endpoints, etc.

Process 700 may further include notifying (at 710) network 105 and/or initiating a remedial action based on the determined policy violation. For example, as discussed above, the network credential may be revoked or suspended, the particular UE 107 may be suspended, traffic to and/or from UE 107 may be rejected (e.g., not forwarded to or from UE 107), and/or other remedial measures may be performed. As discussed above, in some embodiments, different types of policy violations may be associated with different remedial measures. The association between different types of remedial measures and different types of policy violations may be determined or modified using AI/ML techniques or other suitable techniques.

Process 700 may additionally include determining (at 712) an end of the policy violation. For example, UCPS 101 may determine that a threshold time has elapsed since notifying (at 710) network 105 and/or performing other remedial measures. In some embodiments, UCPS 101 may determine the end of the policy violation in some other suitable manner.

Process 700 may also include initiating (at 714) a release of the network credentials and/or some other reversion of the remedial action (performed at 710). For example, UCPS 101 and/or network 105 may remove the suspension of the network credential or UE 107, may reinstate the network credential or UE 107, or otherwise allow the network credential to again be used to access network 105. Some or all of process 700 may be repeated in an ongoing basis, such that after the network credential is released, UCPS 101 may continue to monitor an association between the network credential and a given UE 107 in order to determine whether the policy violation has occurred again, or has continued to occur. For example, such situation may occur when a SIM card is installed in an unauthorized UE 107, and remains in such UE 107 even after the SIM card, associated network credentials, and/or UE 107 has been suspended (at 710). On the other hand, the suspension of the SIM card, associated network credentials, and/or UE 107 (at 710) may result in the policy violation being remedied, such as by the SIM card being moved to a different, authorized UE 107. In any event, the enforcement of the associations between particular UEs 107 and network credentials may provide more granular access control for an operator of network 105, as well as an enhanced user experience for UEs 107, as network 105 may be provisioned, configured, etc. based on expected characteristics of authorized UEs 107.

Figure 8:
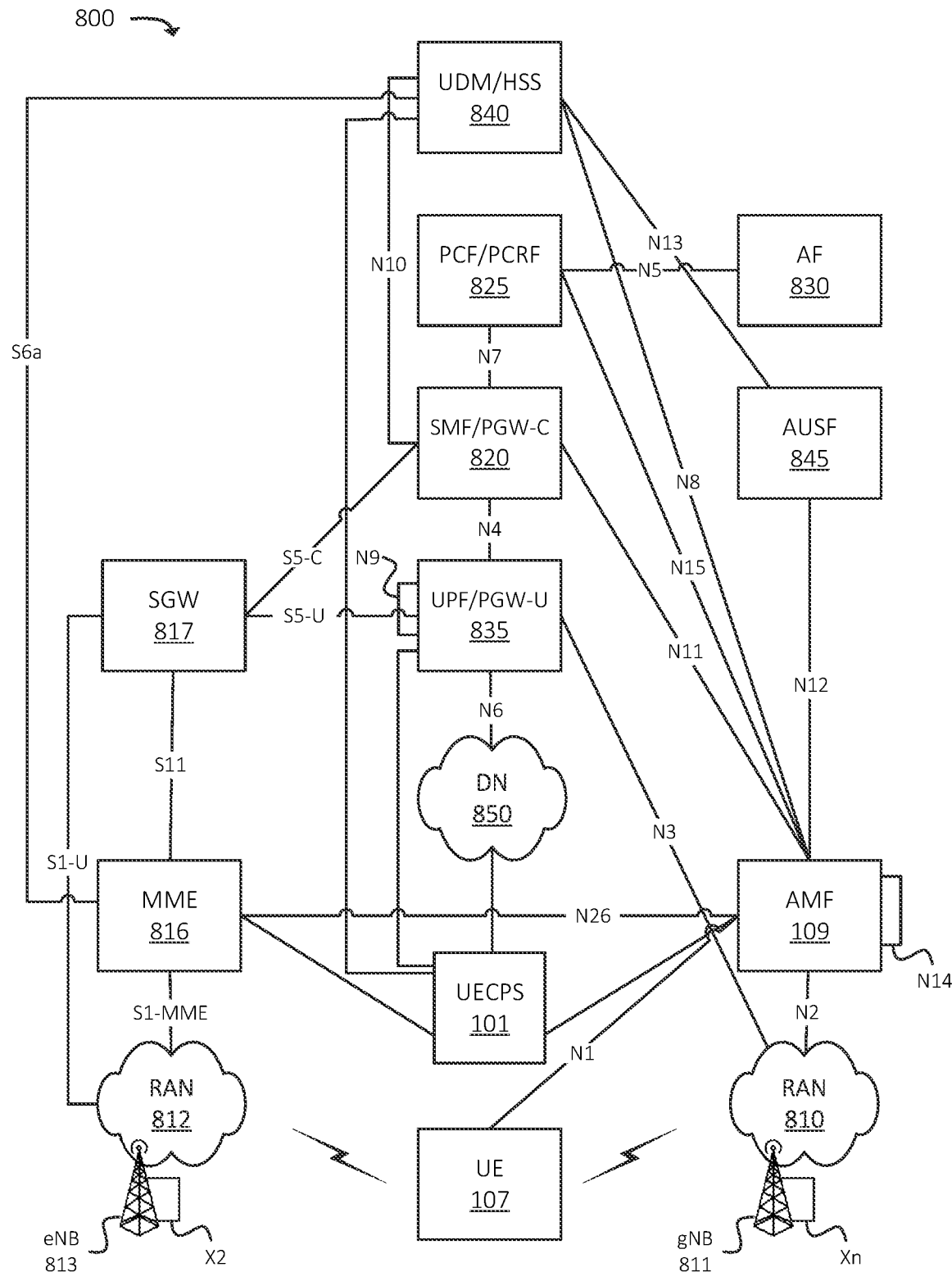
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 800 may represent or may include a 5G core ("5GC"). As shown, environment 800 may include UE 107, RAN 810 (which may include one or more Next Generation Node Bs ("gNBs") 811), RAN 812 (which may include one or more evolved Node Bs ("eNBs") 813), and various network functions such as AMF 109, MME 816, Serving Gateway ("SGW") 817, SMF/Packet Data Network ("PDN") Gateway ("PGW")-Control plane function ("PGW-C") 820, PCF/Policy Charging and Rules Function ("PCRF") 825, Application Function ("AF") 830, UPF/PGW-User plane function ("PGW-U") 835, UDM/HSS 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as UCPS 101.

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF/PGW-C 820, PCF/PCRF 825, UPF/PGW-U 835, UDM/HSS 840, and/or AUSF 845, while another slice may include a second instance of SMF/PGW-C 820, PCF/PCRF 825, UPF/PGW-U 835, UDM/HSS 840, and/or AUSF 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 107 may include a computation and communication device, such as a wireless mobile communication device that is capable of communicating with RAN 810, RAN 812, and/or DN 850. UE 107 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), or another type of mobile computation and communication device. UE 107 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 107 may communicate with one or more other elements of environment 800. UE 107 may communicate with RAN 810 via an air interface (e.g., as provided by gNB 811). For instance, RAN 810 may receive traffic (e.g., voice call traffic, data traffic, messaging traffic, signaling traffic, etc.) from UE 107 via the air interface, and may communicate the traffic to UPF/PGW-U 835, and/or one or more other devices or networks. Further, RAN 810 may receive signaling traffic, control plane traffic, etc. from UE 107 via the air interface, and may communicate such signaling traffic, control plane traffic, etc. to AMF 815 and/or one or more other devices or networks. Additionally, RAN 810 may receive traffic intended for UE 107 (e.g., from UPF/PGW-U 835, AMF 109, and/or one or more other devices or networks) and may communicate the traffic to UE 107 via the air interface.

RAN 812 may be, or may include, a LTE RAN that includes one or more base stations (e.g., one or more eNBs 813), via which UE 107 may communicate with one or more other elements of environment 800. UE 107 may communicate with RAN 812 via an air interface (e.g., as provided by eNB 813). For instance, RAN 812 may receive traffic (e.g., voice call traffic, data traffic, messaging traffic, signaling traffic, etc.) from UE 107 via the air interface, and may communicate the traffic to UPF/PGW-U 835 (e.g., via SGW 817) and/or one or more other devices or networks. Further, RAN 812 may receive signaling traffic, control plane traffic, etc. from UE 107 via the air interface, and may communicate such signaling traffic, control plane traffic, etc. to MME 816 and/or one or more other devices or networks. Additionally, RAN 812 may receive traffic intended for UE 107 (e.g., from UPF/PGW-U 835, SGW 817, and/or one or more other devices or networks) and may communicate the traffic to UE 107 via the air interface.

AMF 109 may include one or more devices, systems, VNFs, CNFs, etc., that perform operations to register UE 107 with the 5G network, to establish bearer channels associated with a session with UE 107, to hand off UE 107 from the 5G network to another network, to hand off UE 107 from the other network to the 5G network, manage mobility of UE 107 between RANs 810 and/or gNBs 811, and/or to perform other operations. In some embodiments, the 5G network may include multiple AMFs 109, which communicate with each other via the N14 interface (denoted in FIG. 8 by the line marked "N14" originating and terminating at AMF 109).

MME 816 may include one or more devices, systems, VNFs, CNFs, etc., that perform operations to register UE 107 with the EPC, to establish bearer channels associated with a session with UE 107, to hand off UE 107 from the EPC to another network, to hand off UE 107 from another network to the EPC, manage mobility of UE 107 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 107. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 107, from DN 850, and may forward the user plane data toward UE 107 (e.g., via RAN 810, SMF/PGW-C 820, and/or one or more other devices). In some embodiments, multiple UPFs 835 may be deployed (e.g., in different geographical locations), and the delivery of content to UE 107 may be coordinated via the N9 interface (e.g., as denoted in FIG. 8 by the line marked "N9" originating and terminating at UPF/PGW-U 835). Similarly, UPF/PGW-U 835 may receive traffic from UE 107 (e.g., via RAN 810, RAN 812, SGW 817, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835. In some embodiments, UPF/PGW-U 835 may include, may implement, may be implemented by, and/or may otherwise be associated with UPF 111. In some embodiments, some or all operations described above with respect to UPF 111 may be performed by UPF/PGW-U 835.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. AUSF 845 and/or UDM/HSS 840 may perform authentication, authorization, and/or accounting operations associated with the subscriber and/or a communication session with UE 107.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 107 may communicate, through DN 850, with data servers, other UEs 107, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 107 may communicate.

Figure 9:
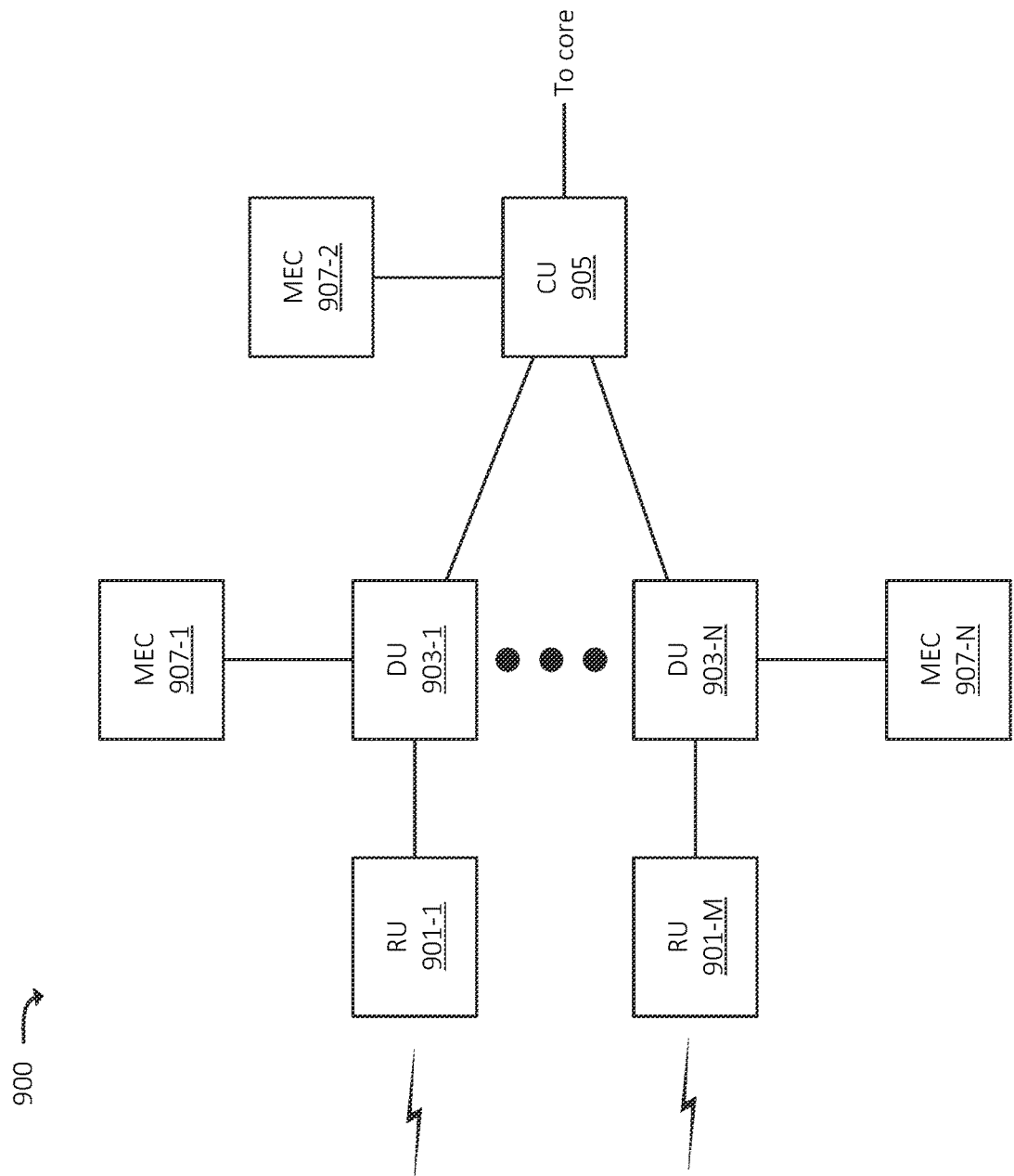
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 810, RAN 812, or some other RAN). In some embodiments, a particular RAN may include one RAN environment 900. In some embodiments, a particular RAN may include multiple RAN environments 900. In some embodiments, RAN environment 900 may correspond to a particular gNB 811 of a 5G RAN (e.g., RAN 810). In some embodiments, RAN environment 900 may correspond to multiple gNBs 811. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 109 and/or UPF/PGW-U 835). In the uplink direction (e.g., for traffic from UEs 107 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 107, and may determine which DU(s) 903 should receive the downlink traffic. DU 903 may include one or more devices that transmit traffic between a core network (e.g., via CU 905) and UE 107 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 107.

RU 901 may include hardware circuitry (e.g., one or more RF transceivers, antennas, radios, and/or other suitable hardware) to communicate wirelessly (e.g., via an RF interface) with one or more UEs 107, one or more other DUs 903 (e.g., via RUs 901 associated with DUs 903), and/or any other suitable type of device. In the uplink direction, RU 901 may receive traffic from UE 107 and/or another DU 903 via the RF interface and may provide the traffic to DU 903. In the downlink direction, RU 901 may receive traffic from DU 903, and may provide the traffic to UE 107 and/or another DU 903.

One or more elements of RAN environment 900, in some embodiments, be communicatively coupled to one or more Multi-Access/Mobile Edge Computing ("MEC") devices, referred to sometimes herein simply as "MECs" 907. For example, DU 903-1 may be communicatively coupled to MEC 907-1, DU 903-N may be communicatively coupled to MEC 907-N, CU 905 may be communicatively coupled to MEC 907-2, and so on. MECs 907 may include hardware resources (e.g., configurable or provisionable hardware resources) that may be configured to provide services and/or otherwise process traffic to and/or from UE 107, via a respective RU 901.

For example, DU 903-1 may route some traffic, from UE 107, to MEC 907-1 instead of to a core network via CU 905. MEC 907-1 may process the traffic, perform one or more computations based on the received traffic, and may provide traffic to UE 107 via RU 901-1. In some embodiments, MEC 907 may include, and/or may implement, some or all of the functionality described above with respect to UCPS 101, AF 830, UPF 835, and/or one or more other devices, systems, VNFs, CNFs, etc. In this manner, ultra-low latency services may be provided to UE 107, as traffic does not need to traverse DU 903, CU 905, links between DU 903 and CU 905, and/or an intervening backhaul network between RAN environment 900 and the core network.

Figure 10:
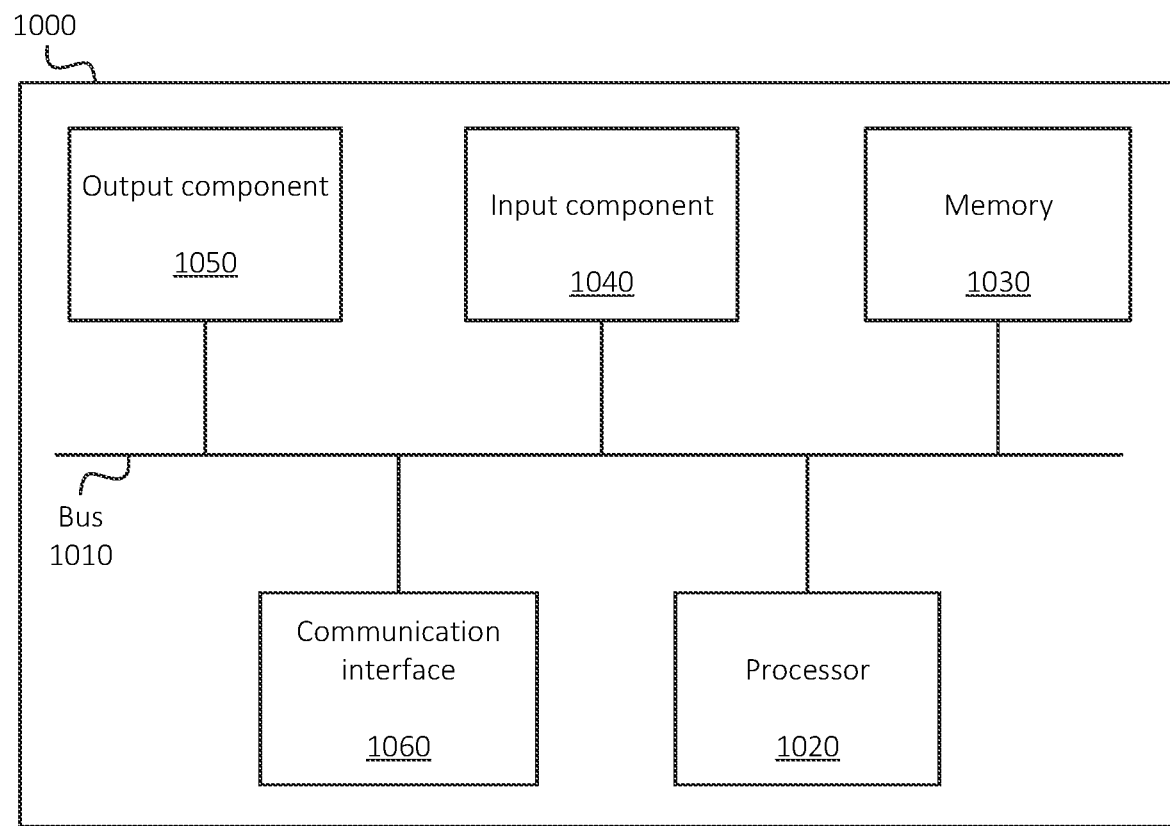
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
  maintain policy information associating a plurality of portable network credentials with respective non-portable device identifiers of User Equipment ("UEs") that are authorized to use respective portable network credentials to access a network;
  receive first network monitoring information indicating that a first UE, associated with a first non-portable device identifier, is accessing the network using a particular portable network credential;
  compare the first non-portable device identifier and the particular portable network credential to the policy information;
  determine, based on comparing the first non-portable device identifier and the particular portable network credential to the policy information, that the first UE is authorized to use the particular portable network credential;
  output a first notification to the network that the first UE is authorized to use the particular portable network credential to access the network, wherein the network allows access to the first UE based on the first notification;
  receive second network monitoring information indicating that a second UE, associated with a second non-portable device identifier, is accessing the network using the particular portable network credential;
  compare the second non-portable device identifier and the particular portable network credential to the policy information;
  determine, based on comparing the second non-portable device identifier and the particular portable network credential to the policy information, that the second UE is not authorized to use the particular portable network credential, wherein determining that the second UE is not authorized to use the particular portable network credential includes:
    identifying a plurality of pairs of non-portable device identifiers and portable network credentials indicated by the policy information, and
    determining that a particular pair, of the second non-portable device identifier of the second particular UE and the particular portable network credential, is not included in the plurality of pairs of non-portable device identifiers and portable network credentials indicated by the policy information; and output a second notification to the network that the second UE is not authorized to use the particular portable network credential to access the network, wherein the network suspends the particular portable network credential based on the second notification.

2. The device of claim 1, wherein the particular portable network credential is associated with a portable mechanism that is capable of being moved from the first UE to the second UE.

3. The device of claim 2, wherein the portable mechanism includes a SIM ("Subscriber Identification Module") card.

4. The device of claim 1, wherein the particular portable network credential includes a Subscription Permanent Identifier ("SUPI").

5. The device of claim 1, wherein the first non-portable device identifier uniquely identifies the first UE, and wherein the second non-portable device identifier uniquely identifies the second UE.

6. The device of claim 5, wherein the first non-portable device identifier includes a first International Mobile Station Equipment Identity ("IMEI") value, and wherein the second non-portable device identifier includes a second IMEI value.

7. The device of claim 1, wherein receiving the first network monitoring information includes receiving the first network monitoring information from at least one of:
   an Access and Mobility Management Function ("AMF") of the network, or
   a Mobility Management Entity ("MME") of the network.

8. A non-transitory computer-readable medium, storing a plurality of processor-executable instructions to:
   maintain policy information associating a plurality of portable network credentials with respective non-portable device identifiers of User Equipment ("UEs") that are authorized to use respective portable network credentials to access a network;
   receive first network monitoring information indicating that a first UE, associated with a first non-portable device identifier, is accessing the network using a particular portable network credential;
   compare the first non-portable device identifier and the particular portable network credential to the policy information;
   determine, based on comparing the first non-portable device identifier and the particular portable network credential to the policy information, that the first UE is authorized to use the particular portable network credential;
   output a first notification to the network that the first UE is authorized to use the particular portable network credential to access the network, wherein the network allows access to the first UE based on the first notification;
   receive second network monitoring information indicating that a second UE, associated with a second non-portable device identifier, is accessing the network using the particular portable network credential;
   compare the second non-portable device identifier and the particular portable network credential to the policy information;
   determine, based on comparing the second non-portable device identifier and the particular portable network credential to the policy information, that the second UE is not authorized to use the particular portable network credential, wherein determining that the second UE is not authorized to use the particular portable network credential includes:
      identifying a plurality of pairs of non-portable device identifiers and portable network credentials indicated by the policy information, and
      determining that a particular pair, of the second non-portable device identifier of the second particular UE and the particular portable network credential, is not included in the plurality of pairs of non-portable device identifiers and portable network credentials indicated by the policy information; and
   output a second notification to the network that the second UE is not authorized to use the particular portable network credential to access the network, wherein the network suspends the particular portable network credential based on the second notification.

9. The non-transitory computer-readable medium of claim 8, wherein the particular portable network credential is associated with a portable mechanism that is capable of being moved from the first UE to the second UE.

10. The non-transitory computer-readable medium of claim 9, wherein the portable mechanism includes a SIM ("Subscriber Identification Module") card.

11. The non-transitory computer-readable medium of claim 8, wherein the particular portable network credential includes a Subscription Permanent Identifier ("SUPI").

12. The non-transitory computer-readable medium of claim 8, wherein the first non-portable device identifier uniquely identifies the first UE, and wherein the second non-portable device identifier uniquely identifies the second UE.

13. The non-transitory computer-readable medium of claim 12, wherein the first non-portable device identifier includes a first International Mobile Station Equipment Identity ("IMEI") value, and wherein the second non-portable device identifier includes a second IMEI value.

14. The non-transitory computer-readable medium of claim 8, wherein receiving the first network monitoring information includes receiving the first network monitoring information from at least one of:
   an Access and Mobility Management Function ("AMF") of the network, or
   a Mobility Management Entity ("MME") of the network.

15. A method, comprising:
   maintaining policy information associating a plurality of portable network credentials with respective non-portable device identifiers of User Equipment ("UEs") that are authorized to use respective portable network credentials to access a network;
   receiving first network monitoring information indicating that a first UE, associated with a first non-portable device identifier, is accessing the network using a particular portable network credential;
   comparing the first non-portable device identifier and the particular portable network credential to the policy information;
   determining, based on comparing the first non-portable device identifier and the particular portable network credential to the policy information, that the first UE is authorized to use the particular portable network credential;
   outputting a first notification to the network that the first UE is authorized to use the particular portable network credential to access the network, wherein the network allows access to the first UE based on the first notification;
   receiving second network monitoring information indicating that a second UE, associated with a second non-portable device identifier, is accessing the network using the particular portable network credential;

comparing the second non-portable device identifier and the particular portable network credential to the policy information;

determining, based on comparing the second non-portable device identifier and the particular portable network credential to the policy information, that the second UE is not authorized to use the particular portable network credential, wherein determining that the second UE is not authorized to use the particular portable network credential includes:

identifying a plurality of pairs of non-portable device identifiers and portable network credentials indicated by the policy information, and determining that a particular pair, of the second non-portable device identifier of the second particular UE and the particular portable network credential, is not included in the plurality of pairs of non-portable device identifiers and portable network credentials indicated by the policy information; and outputting a second notification to the network that the second UE is not authorized to use the particular portable network credential to access the network, wherein the network suspends the particular portable network credential based on the second notification.

16. The method of claim 15, wherein the particular portable network credential is associated with a SIM ("Subscriber Identification Module") card that is capable of being moved from the first UE to the second UE.

17. The method of claim 15, wherein the particular portable network credential includes a Subscription Permanent Identifier ("SUPI").

18. The method of claim 15, wherein the first non-portable device identifier uniquely identifies the first UE, and wherein the second non-portable device identifier uniquely identifies the second UE.

19. The method of claim 18, wherein the first non-portable device identifier includes a first International Mobile Station Equipment Identity ("IMEI") value, and wherein the second non-portable device identifier includes a second IMEI value.

20. The method of claim 15, wherein receiving the first network monitoring information includes receiving the first network monitoring information from at least one of:
 an Access and Mobility Management Function ("AMF") of the network, or
 a Mobility Management Entity ("MME") of the network.

* * * * *